United States Patent [19]

Ryang

[11] Patent Number: 4,517,342

[45] Date of Patent: May 14, 1985

[54] HEAT CURABLE COMPOSITIONS

[75] Inventor: Hong-Son Ryang, Camarillo, Calif.

[73] Assignee: General Electric Company, Schenectady, N.Y.

[21] Appl. No.: 609,365

[22] Filed: May 11, 1984

Related U.S. Application Data

[63] Continuation-in-part of Ser. No. 507,182, Jun. 23, 1983, abandoned.

[51] Int. Cl.³ .............................................. C08G 69/48
[52] U.S. Cl. ................................... 525/431; 525/425; 525/426; 528/15; 528/31; 528/32
[58] Field of Search ....................... 525/431, 425, 426; 528/15, 31, 32

[56] References Cited

U.S. PATENT DOCUMENTS

| | | | |
|---|---|---|---|
| 3,065,194 | 11/1962 | Nitzsche et al. | 260/37 |
| 3,133,891 | 5/1964 | Ceyzeriat | 260/18 |
| 3,159,601 | 12/1964 | Ashby | 260/46.5 |
| 3,159,662 | 12/1964 | Ashby | 260/448.2 |
| 3,220,972 | 11/1965 | Lamoreaux | 260/46.5 |
| 3,385,822 | 5/1968 | Brown, Jr. | 260/46.5 |
| 3,451,965 | 6/1969 | Lewis | 260/46.5 |
| 3,458,469 | 7/1969 | Murphy | 260/37 |
| 3,516,951 | 6/1970 | Smith | 260/2.5 |
| 3,595,832 | 7/1971 | Szendrey | 260/46.5 |
| 3,775,442 | 11/1973 | Hughes | 260/391 |
| 4,088,670 | 5/1978 | Bargain et al. | 260/448.2 |
| 4,208,312 | 6/1980 | Okada et al. | 528/15 |
| 4,213,914 | 7/1980 | Bargain | 556/419 |
| 4,275,184 | 6/1981 | Bargain | 528/26 |
| 4,329,274 | 5/1982 | Faltynek | 524/862 |
| 4,404,350 | 9/1983 | Ryang | 525/431 |

OTHER PUBLICATIONS

Noshay et al., Block Copolymers, p. 402, Academic Press (1977) N.Y.

Chaumont et al., Polymer, 1981, vol. 22, May, p. 663.

Primary Examiner—Melvyn I. Marquis
Attorney, Agent, or Firm—William A. Teoli; James C. Davis, Jr.; James Magee, Jr.

[57] ABSTRACT

A heat curable composition is provided convertible to a high strength silicone elastomer. A norbornane silicone block copolymer having silicon hydride or silicon vinyl functional groups in the silicone block is used in combination with an effective amount of a platinum catalyst and a polyfunctional organosilicon material capable of undergoing a polyaddition reaction with the norbornane silicone block copolymer when thermally activated.

13 Claims, No Drawings

HEAT CURABLE COMPOSITIONS

CROSS REFERENCE TO RELATED APPLICATIONS

The present application is a continuation-in-part of my copending application Ser. No. 507,182, fied June 23, 1983, for Curable Silicone Polyimide Block Copolymers now abandoned.

Reference is also made to my copending application, filed on or about Apr. 30, 1984, Ser. No. 604,569 for Heat Curable Silicone Polyimide Block Copolymers, where these applications are assigned to the same assignee as the present invention and incorporated herein by reference.

BACKGROUND OF THE INVENTION

The present invention relates to heat curable compositions resulting from the use of a platinum catalyst, a norbornane or norbornene silicone block copolymer and a polyfunctional reactive organosilicon material capable of undergoing an $\equiv$SiH to $\equiv$SiC$_2$H$_3$ addition reaction with the norbornane or norbornene silicone block copolymer.

Prior to the present invention, room temperature vulcanizable polydiorganosiloxanes, for example, silanol terminated polydimethylsiloxanes were available in either one-package or two-package systems based on the type of moisture sensitive cross-linking agents utilized in the composition. A typical one-package system is based on the use of methyltriacetoxysilane and a silanol terminated polydimethylsiloxane as shown by Ceyzeriat, U.S. Pat. No. 3,133,891. A two-package system as shown by Nitzsche et al, U.S. Pat. No. 3,065,194 requires the blending of silanol terminated polydimethylsiloxane with a curing catalyst, such as ethyl orthosilicate in combination with dibutyltindilaurate. The two package system requires mixing of the curing catalyst with the silanol terminated polydimethylsiloxane prior to use.

The above described one-package and two-package room temperature vulcanizable compositions generally require the use of reinforcing filler, for example, a silica filler in amounts of from 5–300 parts, per 100 parts of silicone polymer, if improved tensile strength to the resulting cured silicone is desired. Another procedure available to improve the toughness of the cured silicone polymers is the introduction of silarylenesiloxy units into the polymer chain to produce a copolymer consisting essentially of diorganosiloxy units chemically combined with silarylenesiloxy units. Although these procedures substantially enhance the modulus (psi) of the silicone polymer, these procedures are uneconomic or do not achieve the degree of toughness based on elongation (%) x tensile (psi) desired in the end product.

In my copending application Ser. No. 567,609, filed Jan. 3, 1984, for Silicone-Polyimide Copolymers, Condensation Vulcanizable Compositions Obtained Therefrom and Method for Making, silicone-polyimide copolymers are described having terminal silanol or silicon hydride radicals based on the use of a norbornene terminated polyimide. A hydrosilation reaction is employed to introduce silicon-hydrogen onto the terminal norbornene groups of the polyimide. The resulting hydrosilyl terminated polyimide is reacted with silanol terminated polydiorganosiloxane in the presence of a catalyst to produce silanol terminated polydiorganosiloxane-polyimide copolymer. Room temperature or low temperature condensation vulcanizable compositions based on the use of such silanol-terminated copolymers provide cured silicone-polyimide copolymers exhibiting improved toughness.

In my copending application Ser. No. 604,569, Heat Curable Silicone-Polyimide Block Copolymers, filed on Apr. 27, 1984, a free radical initiator such as an organic peroxide is found useful in effecting the thermal cure of a norbornene, or norbornane polydiorganosiloxane which can have chemically combined $\equiv$SiC$_2$H$_3$ units.

The present invention is based on the discovery that heat curable silicone-polyimide compositions convertible to high strength elastomers also can be made by using an effective amount of a platinum catalyst to effect a polyaddition reaction between a polyfunctional organosilicon material, for example, an organosilane or organosiloxane fluid, and a norbornane or norbornene silicone block copolymer defined hereinafter having chemically combined $\equiv$SiC$_2$H$_3$ or $\equiv$SiH units. For example, a mixture of polyvinylarylsilane or vinyl containing polydiorganosiloxane and a silicon hydride terminated polyimide having the formula,

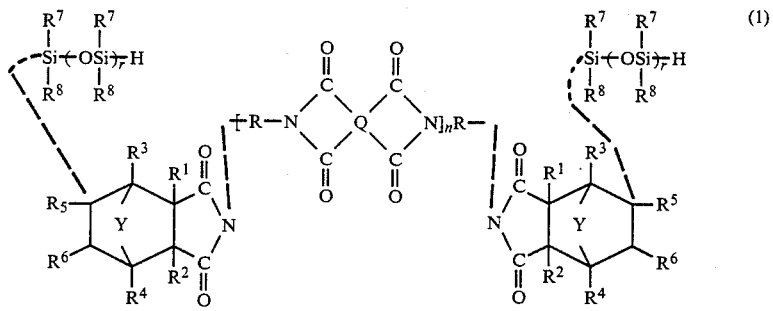

can be readily vulcanized with a platinum catalyst at a temperature of from about 25° C. to about 250° C., where R—R$^8$, Y, Q, and n are as defined below, and r has a value of 0 to 2000 inclusive.

Alternatively, a vinyl terminated silicon-polyimide block polymer of the formula

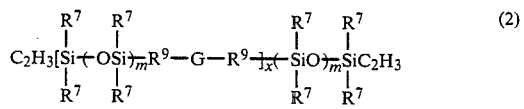

can be vulcanized with a silicon hydride, as defined hereinafter, in the presence of an effective amount of a platinum catalyst, where R$^7$ is defined below, R$^9$ is CH$_2$CH$_2$, m is an integer having a value of 1 to 100, x is an integer having a value of 1 to $10^4$, and G is a divalent group formed by reacting a silicon hydride terminated polyimide of formula (1) with a vinyl terminated polydiorganosiloxane of the formula,

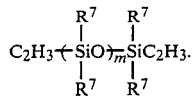 (3)

The resulting silicone polyimide elastomeric copolymers exhibit improved tensile strength (psi) as compared to conventional room temperature vulcanized or organic peroxide cured organopolysiloxane elastomers.

STATEMENT OF THE INVENTION

There is provided by the present invention, a heat curable composition comprising:

(A) a norbornane or norbornene silicone block copolymer having chemically combined blocks selected from
 (i) polydiorganosiloxane having chemically combined ≡SiH or ≡SiC₂H₃ units, and
 (ii) a mixture of (i) and polyimide, (B) a polyfunctional organosilicon material capable of undergoing a polyaddition reaction with (A) involving addition between chemically combined ≡SiH or ≡SiC₂H₃ units, which polyfunctional organosilicon material has at least two chemically combined ≡SiH or ≡SiC₂H₃ units and is selected from organosilanes, organopolysilanes, organosiloxanes, organopolysiloxanes and cyclopolyorganosiloxanes, and mixtures thereof, and (C) an effective amount of a platinum catalyst.

Radicals included within R of formula (1) are, for example, divalent $C_{(2-20)}$ organic radical selected from the class consisting of (a) aromatic hydrocarbon radicals having from 6-20 carbon atoms and halogenated derivatives thereof, (b) alkylene radicals and cycloalkylene radicals having from 2-20 carbon atoms, $C_{(2-8)}$ alkylene terminated polydiorganosiloxane and (c) divalent radicals included by the formula,

Q′

Q′ is a member selected from the class consisting of

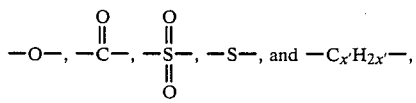

and x′ is a whole number from 1 to 5 inclusive. Radicals included within Q of formula (1) are tetravalent radicals selected from

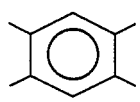

and

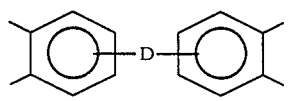

where D is a member selected from

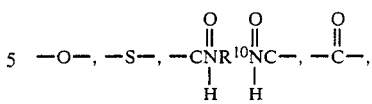

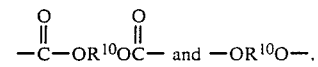

$R^{10}$ is a divalent radical selected from

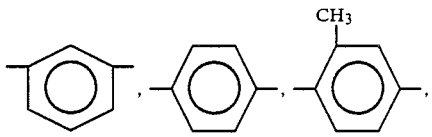

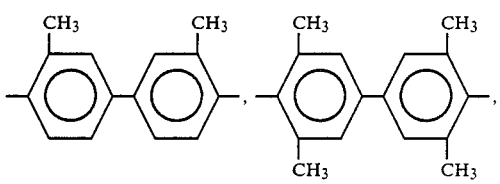

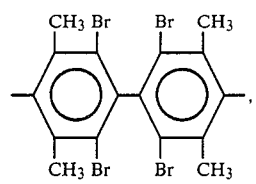

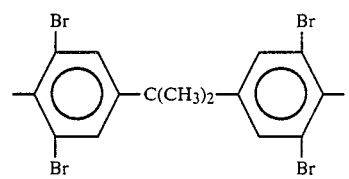

and divalent organic radicals of the general formula,

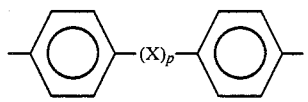

X is a member selected from the class consisting of divalent radicals of the formula,

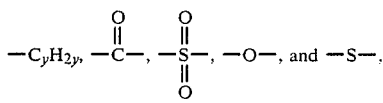

y is an integer from 1 to 5, $R^1$-$R^6$ are selected from hydrogen and $C_{(1-8)}$ alkyl radicals, $R^7$ is the same or different $C_{(1-13)}$ monovalent hydrocarbon radical and substituted $C_{(1-13)}$ monovalent hydrocarbon radical, Y is a divalent radical selected from —O— and —C($R^1$)₂, n is an integer equal to 0-200 inclusive, $R^8$ is selected from hydrogen and $R^7$, and p is equal to 0 or 1.

The silicon hydride terminated polyimide can be made by heating a mixture of a norbornene terminated polyimide of the formula,

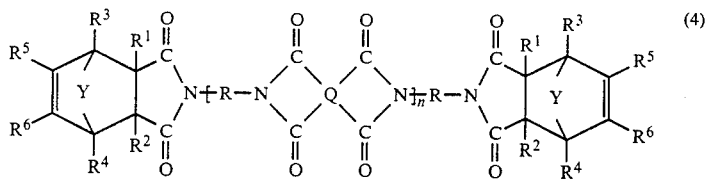 (4)

and a silicon hydride of the formula,

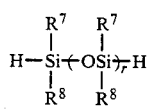 (5)

in the presence of an inert organic solvent and an effective amount of a platinum catalyst and allowing the inert organic solvent to evaporate, where $R$–$R^8$, $Y$, $Q$, $n$ and $r$ are as previously defined.

Radicals included within $R^1$–$R^6$ of formulas 1 and 4 are, for example, hydrogen, methyl, ethyl, propyl, butyl, etc. Radicals included within $R^7$ are, for example, aryl radicals and halogenated aryl radicals, for example, phenyl, chlorophenyl, tolyl, xylyl, biphenyl, naphthyl, etc.; alkenyl radicals, for example, vinyl, allyl, cyclohexenyl, etc.; $C_{(1-8)}$ alkyl radicals and halogenated alkyl, for example, methyl, ethyl, propyl, butyl, octyl, etc.

The norbornene terminated polyimide of formula (4) can be made by effecting reaction between organic diamine, a norbornene anhydride or optionally with a norbornene dicarboxylic acid monoalkylester, and organic dianhydride, in accordance with the following equation:

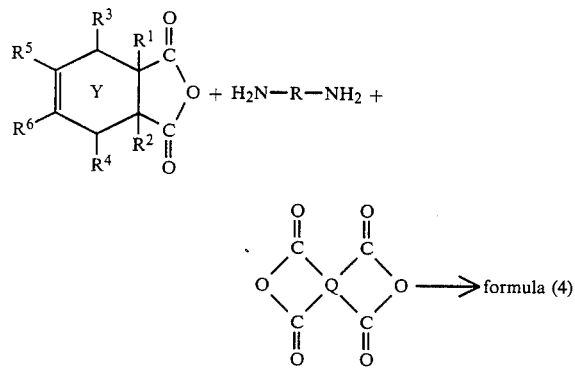

where $Q$, $R$, $R^1$–$R^6$ and $Y$ are as previously defined.

Some of the organic dianhydrides which can be used in the practice of the present invention to produce the norbornene terminated polyimide of formula (4) along with norbornene anhydride, or norbornene dicarboxylic acid monoalkylester, are for example, benzophenone dianhydride, pyromellitic dianhydride, 2,2-bis[4-(3,4-dicarboxyphenoxy)phenyl]propane dianhydride, 2,2-bis[4-(2,3-dicarboxyphenoxy)phenyl]propane dianhydride, 4-(2,3-dicarboxyphenoxy)-4'-(3,4-dicarboxyphenoxy)diphenyl-2,2-propane dianhydride, and bisnorbornanesiloxane dianhydride of the formula,

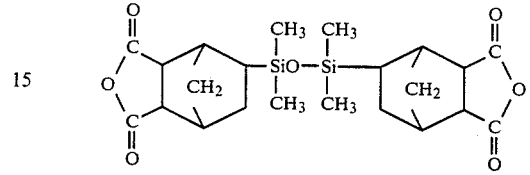

and mixtures thereof.

Organic diamines which can be used to make the polyimide blocks of the silanol terminated polydiorganosiloxane-polyimide copolymers are, for example, o-phenylenediamine;
m-phenylenediamine;
p-phenylenediamine;
4,4'-diaminodiphenylpropane;
4,4'-diaminodiphenylmethane (commonly named 4,4'-methylenedianiline);
4,4'-diaminodiphenylsulfide (commonly named 4,4'-thiodianiline);
4,4'-diaminodiphenyl ether (commonly named 4,4'-oxydianiline);
1,5-diaminonaphthalene;
3,3'-dimethylbenzidine;
3,3'-dimethoxybenzidine;
2,4-bis($\beta$-amino-t-butyl)toluene;
1,3-diamino-4-isopropylbenzene;
1,2-bis(3-aminopropoxy)ethane;
benzidine;
m-xylylenediamine;
p-xylylenediamine;
2,4-diaminotoluene;
2,6-diaminotoluene;
bis (4-aminocyclohexyl)methane;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine
3-methylheptamethylenediamine;
5-methylnonamethylenediamine;
1,4-cyclohexanediamine;
1,12-octadecanediamine;
bis(3-aminopropyl)sulfide;
N-methyl-bis(3-aminopropyl)amine;
hexamethylenediamine;
heptamethylenediamine;
nonamethylenediamine;
decamethylenediamine;
bis(3-aminopropyl)tetramethyldisiloxane;
bis(4-aminobutyl)tetramethyldisiloxane,
and mixtures of such diamines.

In addition to the silicon hydrides of formula (5), there also can be used in the heat curable compositions of the present invention, silicon hydride containing siloxane, as shown by Faltynek U.S. Pat. No. 4,329,274, assigned to the same assignee as the present invention and incorporated herein by reference. For example, there can be used silicon hydride containing siloxane selected from the class consisting of silicon hydride resin consisting essentially of chemically combined diorgano hydride siloxy units and $SiO_2$ units, where the organo radicals attached to silicon are the same as $R^7$, linear hydride polysiloxane consisting essentially of chemically combined hydro organo siloxy units and diorgano siloxy units as previously defined and a linear hydride polysiloxane coupler consisting essentially of chemically combined diorganosiloxy units and terminal diorganohydride siloxy units and mixtures thereof.

Some of the polyvinyldiorganosiloxane utilized in the heat curable organopolysiloxane compositions of the present invention are included within the following formula:

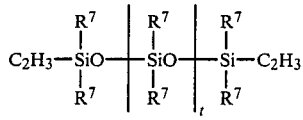

where $R^7$ is as previously defined, and t is 0 or a positive integer having a value sufficient to provide a vinyl siloxane viscosity of from 100 to 200,000 centipoise at 25° C. Preferably, the polyvinyldiorganosiloxane has terminal units of the formula

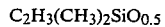

which can vary from about 0.05 to about 3.5 and preferably from 0.14 to about 2 mole percent.

The polyvinyldiorganopolysiloxane which includes both linear and cyclopolysiloxane can be prepared by equilibrating an appropriate cyclo tetrasiloxane with appropriate vinyl terminated low molecular weight polysiloxane chain-stopper. The equilibration catalyst utilized is preferably a mild acid catalyst, such as toluene, sulfonic acid or an acid treated clay such as filtrol, which is a sulfonic acid activated clay manufactured and sold by Filtrol Corporation of Los Angeles, Calif. When the equilibration has proceeded to the point where about 85% of the cyclopolysiloxanes have been converted to the linear polymer, the acid catalyst is neutralized with a base or simply filtered out in the case of the acid activated clay to leave behind the linear polymer. Preferably, excess cyclics are stripped off so that the linear polymer will have a low volatile content and be relatively pure. There can also be utilized an alkali metal hydroxide as the catalyst such as for instance potassium or sodium hydroxide.

Platinum catalysts which can be used in the practice of the present invention are, for example, platinum complexes of unsaturated siloxanes, as shown by Karstedt U.S. Pat. No. 3,775,442, Ashby U.S. Pat. Nos. 3,159,601, and 3,159,662 and Lamoreaux U.S. Pat. No. 3,220,972, assigned to the same assignee as the present invention. An effective amount of a platinum catalyst is about $10^{-4}$ to 0.1% by weight of platinum, based on the weight of the heat curable composition.

Various fillers and pigments can be incorporated into the room temperature vulcanizable compositions of the present invention. For example, there can be used, for example, titanium dioxide, zirconium silicate, silica aerogel, iron oxide, diatomaceous earth, fumed silica, carbon black, precipitated silica, glass fibers, polyvinyl chloride, ground quartz, calcium carbonate etc. The amounts of filler used can obviously be varied within wide limits in accordance with the intended use. For example, in some sealant applications, the curable compositions of the present invention can be used free of filler. In other applications, such as the employment of the curable compositions for making binding material on a weight basis, as much as 700 parts or more of filler, per 100 parts of polydiorganosiloxane-polyimide copolymers can be employed. In such applications, the filler can consist of a major amount of extending materials, such as ground quartz, polyvinyl chloride, or mixtures thereof, preferably having an average particle size in the range of from about 1 to 10 microns.

The synthesis of the norbornene terminated polyimide of formula (4) can be accomplished by conventional procedures, utilizing substantially equal molar amounts of the organic diamine, dianhydride, along with an effective amount of the chain-stopping norbornene anhydride, or norbornene dicarboxylic acid monoalkylester which can be utilized in an amount sufficient to produce the polyimide at a desired molecular weight. During the polymerization of the norbornene terminated polyimide, there can be utilized organic solvents, for example, orthodichlorobenzene, and temperature in the range of from 140° C. to 200° C. can be employed. Reaction can be conducted in an inert atmosphere, for example, under nitrogen to minimize undesirable side reactions. Reaction times can vary from 30 minutes or less to 3 hours, depending upon the nature of the reactants, the molecular weight of the polyimide desired, etc.

The silicon hydride terminated polyimide of formula (1) can be synthesized by effecting reaction between norbornene terminated polyimide of formula (4) and an appropriate silicon hydride of formula (5), such as a dihydrogen silane, dihydrogen disiloxane, in the presence of an effective amount of a platinum catalyst. An effective amount of platinum catalyst is from about $10^{-6}$ part to $10^{-3}$ part of platinum, per part of the hydrosilation mixture. Suitable inert organic solvents which can be used are, for example, toluene, chlorobenzene and orthodichlorobenzene. Hydrosilation is preferably conducted under substantially anhydrous conditions at a temperature in the range of from 0° C. to 200° C.

In order that those skilled in the art will be better able to practice the invention, the following examples are given by way of illustration and not by way of limitation. All parts are by weight.

EXAMPLE 1

A mixture of 19.62 grams (0.1 mole) of norbornene dicarboxylic acid monomethylester and 9.9 grams ($5 \times 10^{-2}$ mole) of 4,4'-methylenedianiline was dissolved in 50 ml of dry methanol. The solution was refluxed for 2 hours under nitrogen. The solvent was then evaporated and the residue was heated to 150° C. for 2 hours in an oven under nitrogen. The residue was dissolved in 50 ml of dry dichloromethane and poured into 300 ml of methanol. There was obtained a white precipitate which was washed in methanol and dried resulting in a yield of 25.7 grams (98%). Based on method of preparation, the product was a diimide having the formula,

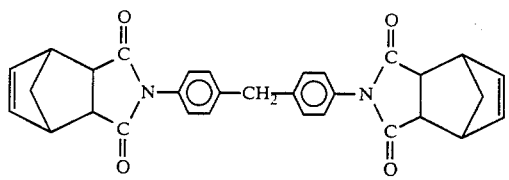

solved in 50 ml of chlorobenzene and poured into 400 ml of methanol. There was obtained 23.6 grams or a 98% yield of an oligoimide which was washed with methanol and dried. Based on method of preparation the resulting product had the formula,

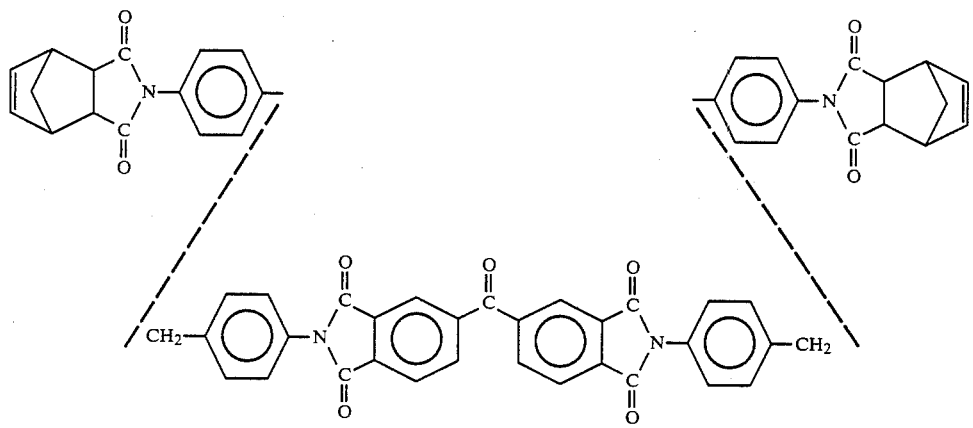

which was confirmed by spectroscopic datum.

There was added 5 drops of a 5% by weight platinum catalyst to a solution in 40 ml of dry chlorobenzene of 0.49 gram ($10^{-3}$ mole) of the above diimide and 3 grams of a silicon hydride terminated polydimethylsiloxane having a molecular weight of about 1500. The resulting solution which had about 0.03% by weight of platinum, based on the weight of total solution was heated to 80° C. over a period of about 8 hours. There was obtained a silicon hydride terminated polyimide siloxane copolymer free of the olefinic unsaturation as shown by NMR spectra.

A mixture was prepared using 1 part of the above platinum containing silicon hydride terminated siloxane imide copolymer and 0.020 part of 1,3,5-trivinyl-1,1,3,3,5,5-pentamethyltrisiloxane. The resulting mixture was heated to 150° C. for 2 hours. There was obtained a cured silicone polyimide elastomer.

EXAMPLE 2

A solution of 9.81 grams ($5 \times 10^{-2}$ mole) of norbornene dicarboxylic acid monomethylester, 966 grams ($2.5 \times 10^{-2}$ mole) of benzophenone tetracarboxylic acid dimethylester and 9.91 grams ($5 \times 10^{-2}$ moles) of 4,4'-methylenediamine in 100 ml of dry methanol was refluxed for 3 hours. After removal of the methanol, the residue was heated to 150° C. for 2 hours in an oven under nitrogen flow. The resulting product was dis- There was added 5 drops of a 5% platinum complex mixture to a solution of 1.17 gram of the above oligoimide, 7.34 grams of a silicon hydride terminated dimethylpolysiloxane having a molecular weight of 5300 in 40 ml of dry chlorobenzene. The mixture was heated to 80° C. for about 8 hours. The resulting mixture was free of olefinic unsaturation as shown by an NMR spectrum. Upon removal of the solvent, there was obtained a sticky silicon hydride terminated siloxane imide block copolymer.

In accordance with the procedure of Example 1, a mixture of 100 parts of the above silicon hydride siloxane imide block copolymer and 5 parts of 1,3,5-trivinyl-1,1,3,3,5,5-pentamethyltrisiloxane is heated to 150° C. for 2 hours. There is obtained a cured elastomeric siloxane imide block copolymer.

EXAMPLE 3

There was added a mixture of 13.68 grams of 5-norbornene-2,3-dicarboxylic anhydride and 43.33 grams of 2,2-bis[4-(3,4-dicarboxyphenoxy)phenyl]propane dianhydride over a period of 10 minutes under nitrogen to a solution of 13.51 grams of meta-phenylene diamine and 100 ml o-dichlorobenzene. The resulting solution was heated to reflux for 2 hours while water was continuously removed azeotropically. The resulting solution was poured into 400 ml of methanol and stirred vigorously. A product was precipitated which was filtered, washed with methanol and dried. Based on method of preparation the product had the following formula,

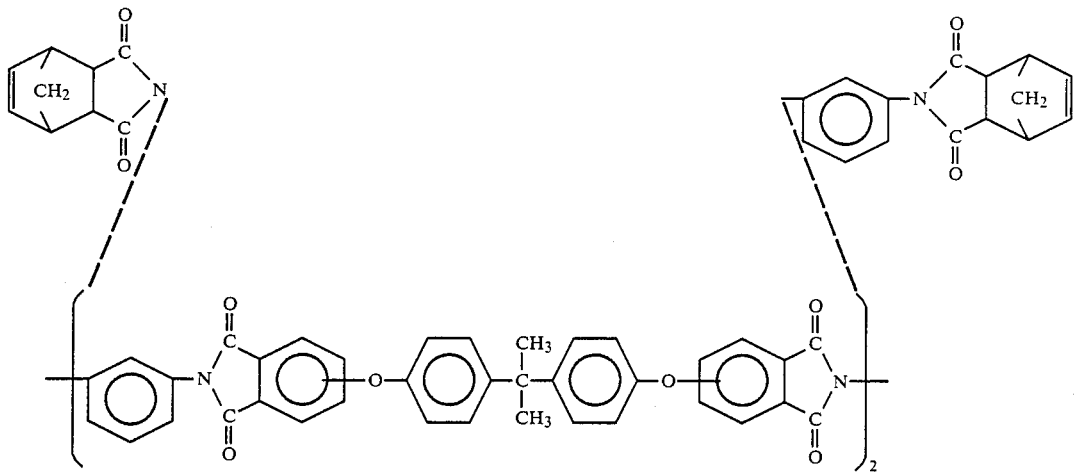

There was obtained 64.8 grams of the above norbornene terminated polyetherimide, which represented a yield of 97%.

There was added under a nitrogen atmosphere, 5 drops of a 5% platinum catalyst prepared in accordance with Karstedt U.S. Pat. No. 3,775,442 to a mixture of 22.0 grams of the above norbornene terminated polyetherimide, 4.0 gram of 1,1,3,3-tetramethyldisiloxane and 40 ml of dry chlorobenzene. The solution was stirred and heated to 70° C. for about 12 hours. Carbon black was added to the resulting mixture at room temperature and the solution was stirred 30 minutes. The mixture was then filtered and the filtrate was poured into 200 ml of dry diethyl ether with vigorous stirring. There was obtained a precipitate which was filtered, washed with diethyl ether and dried. Based on method of preparation, the precipitate which was obtained at a 98% yield, was a silicon hydride terminated polyetherimide having the formula,

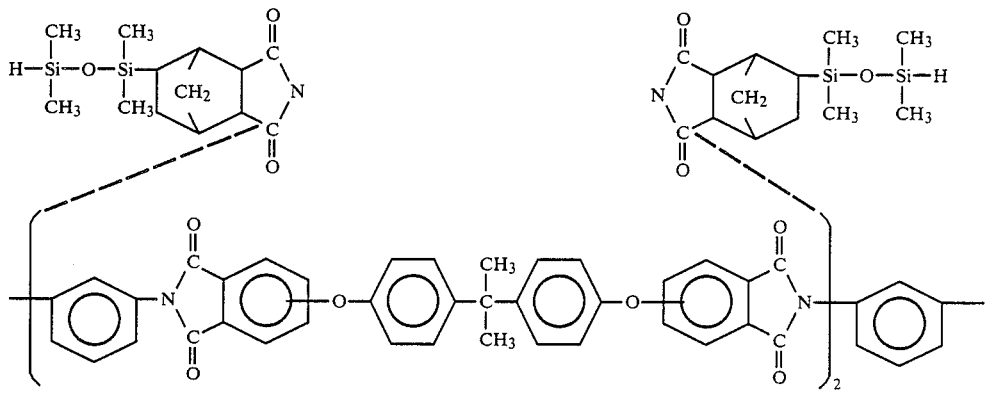

The identity of the product was further confirmed by NMR and IR analysis.

A mixture was heated under substantially anhydrous conditions to 80° C. for about 12 hours consisting of 1.2 gram of the above silicon hydride terminated oligoimide, 1 drop of the platinum catalyst of Example 1, 10 ml of chlorobenzene and 12 grams of a vinyl chain-stopped polydimethylsiloxane having an average molecular weight of about 18,000. Upon evaporation of the solvent, there was obtained a gum-like residue having an intrinsic viscosity in chloroform of 0.44 at 25° C. Based on method of preparation and NMR data, the product was a vinyl chain-stopped polydimethylsiloxane polyimide block polymer having the formula,

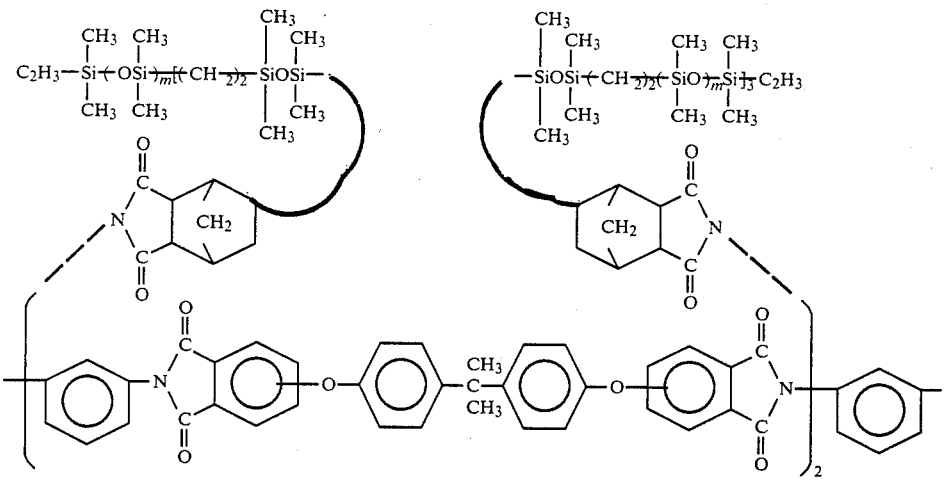

where m is previously defined.

A mixture of 10 grams of the above silicone-polyimide block polymer and 3 grams of a methyl hydrogen fluid having a molecular weight of about 30,000 and 3.5% by weight of chemically combined methyl hydrogen siloxane was heated under vacuum to 80° C. for 12 hours in an oven. There was obtained a tough silicone polyimide elastomer.

EXAMPLE 4

There was added 10 drops of a 5% platinum catalyst prepared in accordance with Karstedt. U.S. Pat. No. 3,775,442, assigned to the same assignee as the present invention, to a mixture while it was being stirred of 69.5 g (0.42 mole) of 5-norbornene-2,3-dicarboxylic acid anhydride, 26.8 g (0.2 mole) 1,1,3,3-tetramethyldisiloxane and 100 ml of dry chlorobenzene. The resulting mixture was heated with stirring to 70°-80° C. for 4 hours and then 100°-110° C. overnight. After cooling, carbon black was added and the solution was stirred for 30 minutes at room temperature. Filtration, removal of the solvent at 100° C. with a vacuum pump and addition of dry diethylether resulted in the precipitation of a white crystalline solid. Based on method of preparation, the product was 5,5'-(1,1,3,3-tetramethyl-1,1,3-disiloxanediyl)-bis-norbornane-2,3-dicarboxylic anhydride having the formula

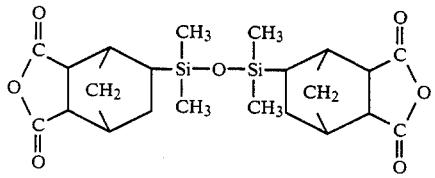

There is added 1 drop of 96% sulfuric acid to a mixture of 0.01 moles of the above dianhydride, 0.01 moles of 1,3,5,7-tetravinyl-1,3,5,7-tetramethylcyclotetrasiloxane and 0.05 moles of octamethylcyclotetrasiloxane in 50 ml of dry toluene. The resulting solution is refluxed for 2 hours. After cooling, carbon black is added and the solution is heated to 100° C. for 1 hour. Filtration and evaporation gives a colorless oil. Based on method of preparation, there is obtained a methylvinylpolysiloxane having terminal norbornane anhydride groups.

There is added to a solution of $5\times 10^{-3}$ moles of methylene dianiline and 5 ml of dimethylformamide, while it is stirred under nitrogen, a mixture of $10^{-3}$ mole of the above norbornane anhydride methylvinylsiloxane, $4\times 10^{-3}$ mole of benzophenone tetracarboxylic dianhydride, and 5 ml of dimethylformamide. The resulting mixture is stirred for 2 hours at 50° C. There is obtained a silicon-amide acid copolymer. The solution is then poured into a glass dish and dried at 80° C. for 1 hour and 150° C. for 2 hours in an oven cast and flowing nitrogen. Based on method of preparation, there is obtained a silicon polyimide block copolymer having dimethylsiloxy units and methylvinylsiloxy units in the siloxane blocks.

A mixture of 10 grams of the above silicone polyimide block copolymer and 3 grams of the methyl hydrogen fluid of example 3 is heated under vacuum to 80° C. for 12 hours in an oven. There is obtained a tough silicone polyimide elastomer.

Although the above examples are directed to only a few of the very many variables which can be used in making the curable siloxane imide block copolymers of the present invention, it should be understood that the present invention is directed to a much broader variety of heat curable platinum containing siloxane imide block copolymers and method for making.

What I claim as new and desire to secure by Letters Patent of the United States is:

1. A heat curable composition comprising
    (A) a norbornane silicone block copolymer having chemically combined blocks selected from
        (i) polyorganosiloxane having chemically combined ≡SiH or ≡SiC$_2$H$_3$ units, and
        (ii) and mixture of (i) and polyimide,
    (B) a polyfunctional organosilicon material capable of undergoing a polyaddition reaction with (A) involving addition between chemically combined ≡SiH or ≡SiC$_2$H$_3$ units, which polyfunctional organosilicon material has at least two chemically combined ≡SiH or ≡SiC$_2$H$_3$ units and is selected from organosilanes, organopolysilanes, organosiloxanes, organopolysiloxanes and cyclopolyorganosiloxanes, and
    (C) an effective amount of a platinum catalyst.

2. A heat curable composition comprising a norbornene terminated polyimide, a silicon hydride and an effective amount of a platinum catalyst.

3. A heat curable composition in accordance with claim 2, where the norbornene terminated polyimide is a norbornene terminated polyetherimide.

4. A heat curable composition in accordance with claim 2, where the silicon hydride is a silicon hydride siloxane.

5. A heat curable composition in accordance with claim 1 comprising a vinyl terminated poly(norbornane imide siloxane), a silicon hydride siloxane and an effective amount of a platinum catalyst.

6. A heat curable composition comprising a norbornane terminated polyimide chain-stopped with silicon hydride, a poly(vinyldiorganosiloxane) and an effective amount of a platinum catalyst.

7. A heat curable composition in accordance with claim 6, where the norbornane terminated polyimide chain-stopped with silicon hydride is a norbornane terminated polyetherimide chain-stopped with silicon hydride.

8. A heat curable composition in accordance with claim 6, where the poly(vinyldiorganosiloxane) is a vinyl chain-stopped polydiorganosiloxane.

9. A heat curable composition in accordance with claim 5, where the poly(vinyldiorganosiloxane) is a vinyl containing cyclodiorganosiloxane.

10. A heat curable silicone polyimide copolymer composition comprising by weight,
   (A) 100 parts of a silicon hydride terminated polyimide resulting from the reaction of an organic diamine with a norbornene anhydride or norbornene dicarboxylic acid monoalkylester, or a mixture thereof with an aromatic organic dianhydride,
   (B) 1 to 200 parts of a poly(vinyldiorganosiloxane) having a viscosity of from about 10 to 200,000 centipoise at 25° C., consisting essentially of diorganosiloxy units chemically combined with vinylorganosiloxy units and
   (C) an effective amount of a platinum catalyst.

11. A composition in accordance with claim 10, where the polyvinylorganosiloxane is 1,3,5-trivinyl-1,1,3,5,5-pentamethyltrisiloxane.

12. A composition in accordance with claim 10, where the polyvinylorganosiloxane is a vinyl terminated polydimethylsiloxane.

13. A heat curable silicone polyimide copolymer composition comprising by weight,
   (A) 100 parts of a vinyl terminated silicone norbornane polyimide copolymer,
   (B) 1 to 200 parts of a silicon hydride siloxane, and
   (C) an effective amount of a platinum catalyst.

* * * * *